United States Patent
Etzkorn et al.

(10) Patent No.: US 10,840,483 B1
(45) Date of Patent: Nov. 17, 2020

(54) SYSTEMS AND METHODS FOR PACKAGING A SOLID-STATE BATTERY

(71) Applicant: Verily Life Sciences LLC, Mountain View, CA (US)

(72) Inventors: James Etzkorn, Mountain View, CA (US); Kedar Shah, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 104 days.

(21) Appl. No.: 16/165,131

(22) Filed: Oct. 19, 2018

Related U.S. Application Data (63) Continuation of application No. 15/422,041, filed on Feb. 1, 2017, now Pat. No. 10,135,041.

(51) Int. Cl.
*H01M 10/0525* (2010.01)
*H01M 2/10* (2006.01)
*H01M 10/0585* (2010.01)
*H01M 2/24* (2006.01)
*H01M 2/14* (2006.01)

(52) U.S. Cl.
CPC ............ *H01M 2/10* (2013.01); *H01M 2/14* (2013.01); *H01M 2/24* (2013.01); *H01M 10/0585* (2013.01); *H01M 2220/30* (2013.01)

(58) Field of Classification Search
CPC .................. H01M 10/0525; H01M 10/052
See application file for complete search history.

(56) References Cited

U.S. PATENT DOCUMENTS

| | | | |
|---|---|---|---|
| 10,135,041 B1 | 11/2018 | Etzkorn et al. | |
| 2008/0090146 A1* | 4/2008 | Batson | B23K 1/0016 429/200 |
| 2011/0003182 A1* | 1/2011 | Zhu | H01M 10/482 429/50 |
| 2011/0076550 A1 | 3/2011 | Liang et al. | |
| 2014/0370400 A1* | 12/2014 | Miyazawa | H01M 4/8605 429/405 |

OTHER PUBLICATIONS

Yang, H. S., "Design, Fabrication, and Characterization of Freestanding Mechanically Flexible Interconnects Using Curved Sacrificial Layer," IEEE Transactions on Components, Packaging, and Manufacturing Technology, vol. 2, No. 4, Apr. 2012.

\* cited by examiner

*Primary Examiner* — Olatunji A Godo
(74) *Attorney, Agent, or Firm* — McDonnell Boehnen Hulbert & Berghoff LLP (57) ABSTRACT

The present disclosure relates to systems and methods for packaging a solid-state battery. Consistent with some embodiments, a package for a solid-state battery includes a substrate, a cap disposed over the substrate and forming an enclosure with the substrate, and a solid-state battery disposed inside the enclosure. The solid-state battery includes a first electrode that is disposed over the substrate, an electrolyte that is disposed over the first electrode, and a second electrode that is disposed over the electrolyte. The package further includes a compressible component disposed inside the enclosure and between the cap and the second electrode of the solid-state battery. The compressible component applies a pressure to at least one of the electrodes of the solid-state battery in a direction substantially perpendicular to the electrode(s) of the solid-state battery.

19 Claims, 7 Drawing Sheets

SYSTEMS AND METHODS FOR PACKAGING A SOLID-STATE BATTERY

CROSS-REFERENCE TO RELATED APPLICATIONS

This application is a continuation of U.S. patent application Ser. No. 15/422,041, filed Feb. 1, 2017, which is incorporated herein by reference.

TECHNICAL FIELD

The present disclosure generally relates to solid-state batteries and packaging techniques for such batteries. More specifically, and without limitation, the present disclosure relates to systems and methods for packaging a solid-state battery.

BACKGROUND

Advances in battery technology have enabled the fabrication of tiny, high-energy-density electrochemical batteries capable of powering a wide variety of devices for extended periods of time while occupying small volumes. An electrochemical battery comprises an electrolyte interposed between two electrodes (i.e., an anode and a cathode). Electrochemical reactions between the anode and the electrolyte and between the electrolyte and the cathode cause an electrical potential to be generated between the electrodes. Continued electrochemical reactions drive an electrical current from one electrode, through a device connected to the electrodes, to the opposite electrodes, allowing various devices to be powered by the electrical current.

Lithium ion batteries, for example, include a cathode and an anode separated from one another by an electrolyte that transfers lithium ions. During discharge, when the battery is providing current to a device connected across the electrodes, redox reactions occur at the two electrodes. Oxidation reactions at the anode ionize lithium, which releases electrons to the connected circuit from the anode causing a current to flow through the connected device from cathode to anode (i.e., reverse the direction of electron travel). Lithium ions are transferred through the electrolyte from the anode to the cathode to balance the flow of electrons in the device. At the cathode, the lithium ions and electrons are reduced. The difference in energy potential between the lithium when at the anode and at the cathode corresponds to the chemically stored energy in the battery. In some cases, lithium batteries may be re-charged by applying a reverse current to the electrodes, which causes lithium ions to traverse the electrolyte in the opposite direction, and to re-supply the anode with lithium.

Some electrochemical batteries may be implemented as solid-state batteries. That is, the electrodes and electrolyte can each be solid-state films, which may be layered on top of one another to create a stacked structure disposed on a substrate. Solid-state batteries have various advantages over conventional batteries. For example, solid-state batteries typically have a higher energy density; faster charging capabilities; longer life; and lower leakage current. Further, the electrolyte in solid-state batteries are typically not flammable, unlike the organic solvents used in conventional batteries.

Various techniques and systems exist for packaging a solid-state battery. One technique involves forming a solid-state battery on a substrate and applying a polymeric sealant material over and around the solid-state battery. The polymeric sealant material may act as a moisture barrier that prevents moisture from reaching the battery and negatively affecting battery performance.

However, the above and similar approaches for sealing a solid-state battery have a number of challenges and shortcomings. One challenge arises from the fact that solid-state batteries will expand and shrink during operation. For example, solid-state batteries may expand as they are charged and shrink as they are drained. As a result, the polymeric or other sealant material encapsulating the solid-state battery may break after a small number of charge/discharge cycles.

Accordingly, there exists a need for improved systems and methods for packaging a solid-state battery, including solutions that can address the challenge associated with the expanding and shrinking of a solid-state battery during operation.

SUMMARY

The present disclosure includes systems and methods for packaging a solid-state battery. In illustrative embodiments, a package is capable of hermetically enclosing a solid-state battery and improving the performance of the battery. As disclosed herein, in some embodiments the package provides a compressive force or pressure to the solid-state battery and thereby improves performance over the operation of the battery. Furthermore, according to embodiments of the present disclosure, the reliability of the package is minimally affected by the expansion and shrinkage of the solid-state battery during operation.

In accordance with one example embodiment, a package for a solid-state battery includes a substrate, a cap disposed over the substrate and forming an enclosure with the substrate, and a solid-state battery disposed inside the enclosure formed between the cap and substrate. A first electrode of the solid-state battery is disposed over the substrate, an electrolyte of the solid-state battery is disposed over the first electrode, and a second electrode of the solid-state battery is disposed over the electrolyte. The package further includes a compressible component disposed inside the enclosure and between the cap and the second electrode of the solid-state battery. The compressible component applies a pressure to at least the second electrode of the solid-state battery in a direction substantially perpendicular to the second electrode of the solid-state battery.

In accordance with another example embodiment, a method of packaging a solid-state battery includes disposing a solid-state battery on a substrate. The solid-state battery includes a first electrode that is disposed over the substrate, an electrolyte that is disposed over the first electrode, and a second electrode that is disposed over the electrolyte. The method further includes providing a compressible component that is operable between a compressed state and non-compressed state, and enclosing the solid-state battery with a cap that is disposed over the substrate and with the compressible component disposed in a compressed state between the solid-state battery and the cap, such that the compressible component applies a pressure to at least the second electrode of the solid-state battery in a direction substantially perpendicular to the second electrode of the solid-state battery.

In accordance with yet another example embodiment, a system is provided that comprises an electronic circuit having a first node, a second node, and a power source. The power source includes a substrate, a cap disposed over the substrate and forming an enclosure with the substrate, and a solid-state battery disposed inside the enclosure. A first electrode of the solid-state battery is disposed over the substrate, an electrolyte of the solid-state battery is disposed over the first electrode, and a second electrode of the solid-state battery is disposed over the electrolyte. The system further includes a compressible component disposed inside the enclosure and between the cap and the second electrode of the solid-state battery. The compressible component applies a pressure to at least the second electrode of the solid-state battery in a direction substantially perpendicular to the second electrode of the solid-state battery.

Before explaining example embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF DRAWINGS

The accompanying drawings, which are incorporated in and constitute part of this specification, and together with the description, illustrate and serve to explain the principles of various exemplary embodiments.

DETAILED DESCRIPTION OF EXAMPLE EMBODIMENTS

Embodiments of the present disclosure provide improved systems and methods for packaging a solid-state battery. The disclosed systems and methods are capable of hermetically enclosing, and applying compressive pressure to, a solid-state battery to improve its performance. Furthermore, in accordance with embodiments of the present disclosure, the reliability of the package is minimally affected by the expansion and shrinkage of the solid-state battery during operation.

Reference will now be made in detail to embodiments according to the present disclosure, the examples of which are described herein and illustrated in the accompanying drawings. Wherever possible, the same reference numbers will be used throughout the drawings to refer to the same or like parts.

Figure 1A:
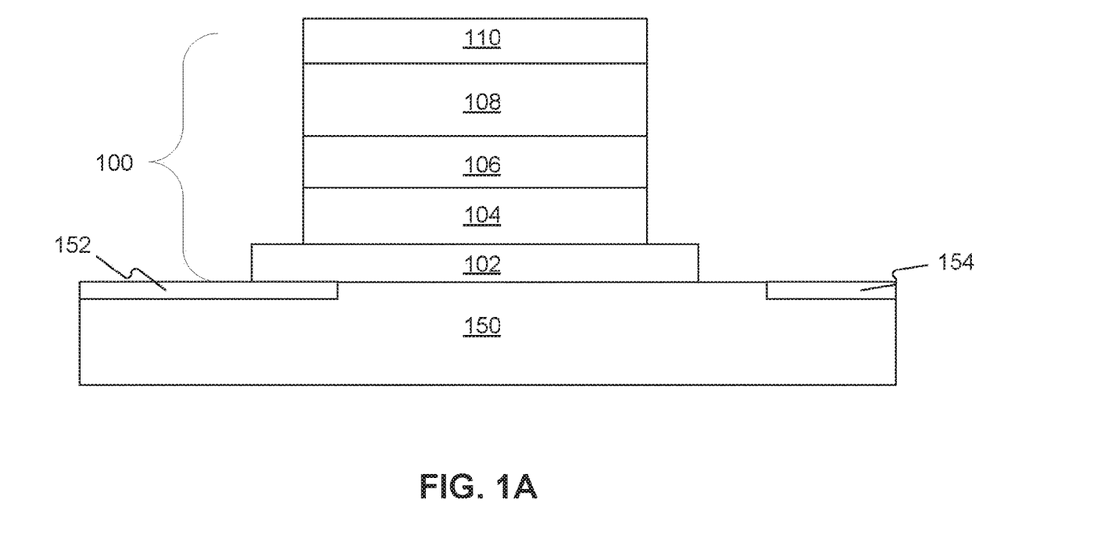
FIGS. 1A-1B illustrate example solid-state batteries disposed on substrates, in accordance with embodiments of the present disclosure.

FIG. 1A illustrates a cross-sectional view of an example solid-state battery 100 disposed on a substrate 150, in accordance with embodiments of the present disclosure. In FIG. 1A, solid-state battery 100 includes a cathode contact 102 disposed on substrate 150, a cathode 104 disposed on cathode contact 102, an electrolyte 106 disposed on cathode 104, an anode 108 disposed on electrolyte 106, and an anode contact 110 disposed on anode 108. In some embodiments, solid-state battery 100 may not include anode 108, and anode contact 110 may be disposed directly on electrolyte 106.

Solid-state battery 100 may generate power as a result of electrochemical reactions between anode 108 and electrolyte 106 and between electrolyte 106 and cathode 104. These reactions may cause an electrical potential to be generated between the two electrodes (i.e., between anode 108 and cathode 104) of solid-state battery 100. Therefore, when a device to be powered is connected to the two electrodes of solid-state battery 100, the electrical potential may drive an electrical current from one electrode, through the device, to the opposite electrode, allowing the device to be powered by the electrical current.

A device requiring electrical current may be connected to solid-state battery 100 via electrical wires or connections that are on or in substrate 150, in some embodiments. For example, in FIG. 1A, substrate 150 includes a first wire 152 and a second wire 154 that electrically connect to the device to be powered. Cathode contact 102 is disposed directly over first wire 152 thereby becoming electrically connected to it. However, an additional interconnect (not shown) may be needed to electrically connect anode contact 110 to second wire 154 for solid-state battery 100 in FIG. 1A.

In some embodiments, substrate 150 may be a silicon substrate and first wire 152 and second wire 154 may be a patterned metal layer formed using back-end-of-line (BEOL) processes. Alternatively, substrate 150 may be a package substrate (e.g., ceramic) and first wire 152 and second wire 154 may be formed using one or more laminate processes.

Figure 1B:
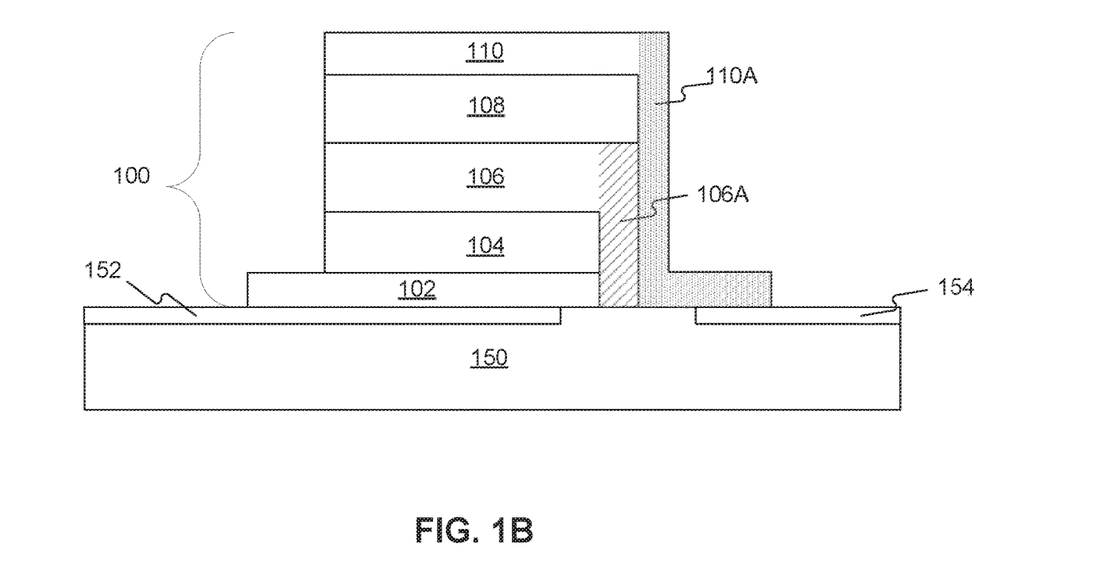

FIG. 1B illustrates a cross-sectional view of another example solid-state battery 100 disposed on substrate 150, in accordance with embodiments of the present disclosure. Solid-state battery 100 of FIG. 1B is similar to solid-state battery 100 of FIG. 1A except that electrolyte 106 now includes a side portion 106A, which is disposed over a side of cathode contact 102 and cathode 104. Further, in solid-state battery 100 of FIG. 1B, anode contact 110 now includes a side portion 110A, which is disposed over the side portion 106A of electrolyte 106. Electrolyte 106 may behave as an insulator when it is not interposed between an anode and a cathode, therefore side portion 106A of electrolyte 106 may prevent current from flowing directly between cathode contact 102 and side portion 110A of anode contact 110.

Unlike solid-state battery 100 of FIG. 1A, solid-state battery 100 of FIG. 1B may be electrically connected to first wire 152 and second wire 154 without any additional interconnect. For example, in FIG. 1B, cathode contact 102 is disposed directly on at least a portion of first wire 152 and side portion 110A of anode contact 110 is disposed directly on at least a portion of second wire 154.

In some embodiments, cathode contact 104 and/or anode contact 110 may be made of metal. For example, cathode contact 104 and/or anode contact 110 may be made of platinum, titanium, gold, or a combination thereof. In some embodiments, cathode contact 104 and/or anode contact 110 may include a plurality of layers. Each layer of the plurality of the layers may be made of metal, for example. In some embodiments, cathode contact 104 may have a thickness between 100-500 nm. In some embodiments, anode contact 110 may have a thickness between 0.1-5 microns. In some embodiments, anode contact 110 may have a thickness over 5 microns. In these embodiments, anode 108 may be made of lithium. In some embodiments, cathode 106 may be made of $LiCoO_2$. In some embodiments, cathode 106 may have a thickness between 2-30 microns. In some embodiments, cathode 106 may have a thickness of around 5 microns. In some embodiments, electrolyte 106 may be made of LiPON. In some embodiments, electrolyte 106 may have a thickness between 2-10 microns.

Performance of solid-state battery 100 depends of various factors, such as, but not limited to, material and size of the electrodes and electrolyte. In accordance with embodiments of the present disclosure, performance of solid-state battery 100 may be improved by applying compressive pressure between the electrodes. For example, applying pressure may prevent formation of a gap between anode 108 and electrolyte 106 during operation thereby improving the battery's capacity retention.

Figure 2A:
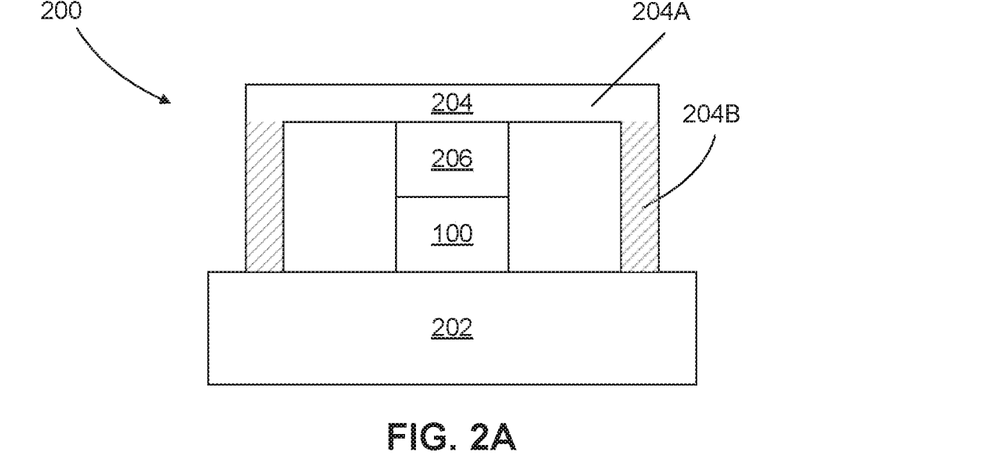
FIGS. 2A-2C illustrate example enclosure configurations of a package enclosing a solid-state battery, in accordance with embodiments of the present disclosure.
Figure 2B:
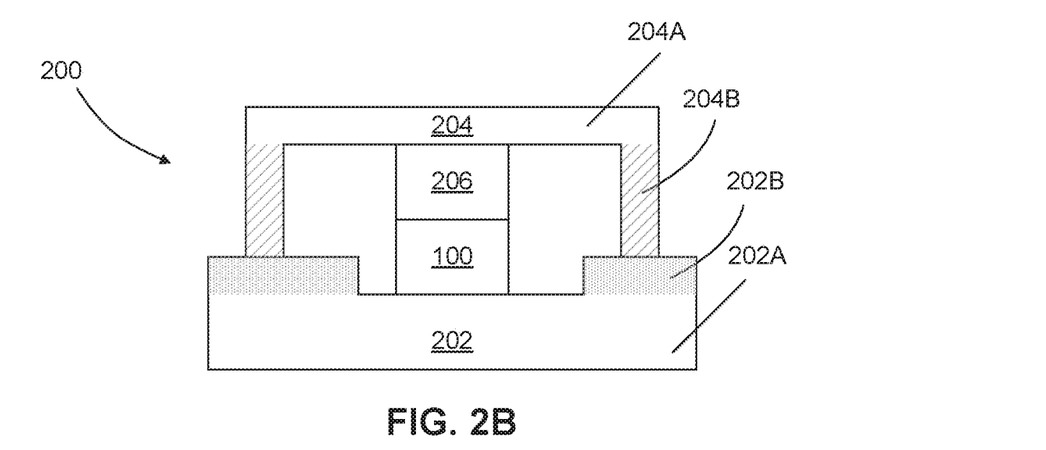
Figure 2C:
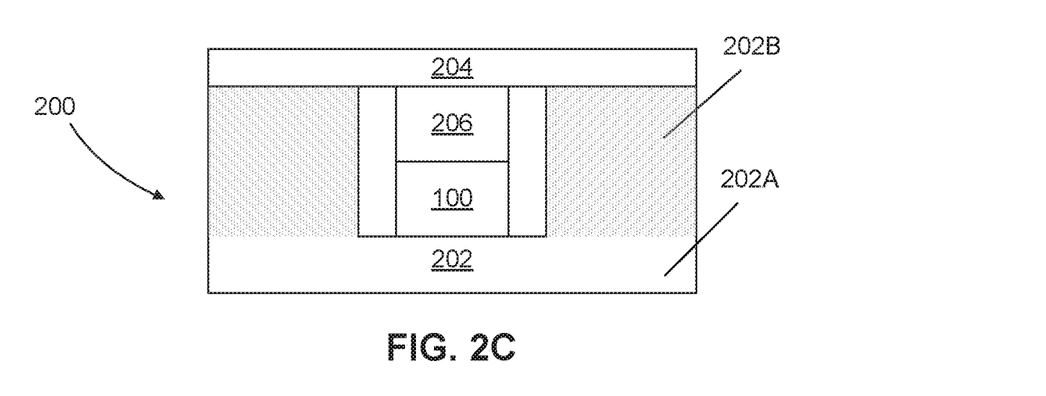

FIGS. 2A-2C illustrate various enclosure configurations of package 200 for enclosing solid-state battery 100, in accordance with embodiments of the present disclosure. As shown in FIGS. 2A-2C, package 200 includes a substrate 202 and a cap 204. With cap disposed over substrate 202, an enclosure may be formed that hermetically encloses solid-state battery 100. As part of the enclosure formed by substrate 202 and cap 204 in FIGS. 2A-2C, a layer of bonding material, such as epoxy or solder (not shown in the figures) may be disposed where substrate 202 and cap 204 interface. Other sealing and/or bonding materials may be used and, in some embodiments, the enclosure may include or be formed by additional parts.

Substrate 202 may be made of any of a variety of semiconductor materials, such as silicon, germanium, gallium arsenide, indium phosphide, etc. In other embodiments, substrate 202 may be made of electrically non-conductive materials, such as a glass or sapphire. Additionally, substrate 202 may be an entire wafer or a panel or a portion of a wafer (e.g., a die) or a panel.

As shown in FIGS. 2A-2C, package 200 further includes a compressible component 206 interposed between solid-state battery 100 and cap 204. Compressible component 206 is capable of being compressed when pressure is applied (i.e., a compressed or partially compressed state) and returning to its original shape when the pressure is removed (i.e., a non-compressed state). In some embodiments, compressible component 206 is capable of being elastically deformed with minimal plastic deformation. In FIGS. 2A-2C, compressible component 206 shown is in a partially compressed state. Therefore, in response to the expansion and shrinkage of solid-state battery 100, compressible component 206 may be further compressed when the applied pressure is increased, but it may expand when the applied pressure is decreased.

In some embodiments, substrate 202 and/or cap 204 may be made of one or more rigid materials. In these embodiments, compressible component 206 may apply pressure to solid-state battery 100 against substrate 202. That is, compressible component 206 may apply a pressure to at least one electrode of solid-state battery 100 in a direction substantially perpendicular to the electrode(s) of solid-state battery 100. As discussed above, such pressure may improve performance of solid-state battery 100.

Furthermore, compressible component 206 may mitigate stress caused by the expansion and shrinkage of solid-state battery 100 (e.g., when being charged or discharged). For example, when solid-state battery 100 expands, compressible component 206 may become further compressed to reduce the amount of force applied to cap 204 and substrate 202 caused by the expansion of the battery. On the other hand, when solid-state battery 100 shrinks, compressible component 206 may expand and continue to apply compressive pressure to solid-state battery 100 to maintain the battery performance.

Without compressible component 206, reliability of package 200 may be affected. For example, if solid-state battery 100 is interposed between cap 204 and substrate 202 without compressible component 206 and without a sufficient gap, one or more parts of package 200 and/or solid-state battery 100 may physically break as solid-state battery 100 expands. Even if package 200 and/or solid-state battery 100 are able to withstand the stress/strain caused by the expansion of solid-state battery 100, such stress/strain may negatively impact long-term reliability of package 200 and/or solid-state battery 100. Even if a gap (without any compressible component 206) was introduced between cap 204 and solid-state battery 100, in such configurations, the performance improvement from applying compressive pressure to solid-state battery 100 may not be achievable.

In some embodiments, compressible component 206 may have a thickness that varies between 2-100 microns as solid-state battery 100 is charged and discharged. In an non-compressed state, compressible component 206 may have a thickness between 2-100 microns and may apply compressive pressure to solid-state battery 100 that varies between 0.1-10 $NF/m^2$ as solid-state battery 100 is charged and discharged. Further, in some embodiments, compressible component 206 may be capable of becoming compressed to a thickness between 2-100 microns. Also, in some embodiments, compressible component 206 may change its thickness by 1-15 microns during operation.

In FIG. 2A, solid-state battery 100 is formed on a substrate 202, and compressible component 206 is disposed on solid-state battery 100. Further, cap 204 of FIG. 2A includes a cavity and is attached to substrate 202 so as to enclose solid-state battery 100. In FIG. 2A, cap 204 includes a flat portion 204A and spacer portions 204B attached to flat portion 204A. However, in some embodiments, a cavity may be formed in cap 204 by etching a flat substrate. Package 200 of FIG. 2B is similar to package 200 of FIG. 2A except that substrate 202 now includes a cavity and that solid-state battery 100 is formed within the cavity of substrate 202. The cavity of substrate 202 may be formed by etching a flat substrate. Alternatively, or additionally, as show in FIG. 2B, substrate 202 may include a flat portion 202A and spacer portions 202B attached to the flat portion 202A. Package 200 of FIG. 2C is similar to package 200 of FIG. 2B except that the cavity of substrate 202 is greater in depth and sufficient to allow solid-state battery 100 to be enclosed by a flat cap 204 without any spacer portions. In FIGS. 2A-2C, compressible component 206 is shown to be disposed between cap 204 and solid-state battery 100. However, in some embodiments, compressible component 206 may be disposed between substrate 202 and solid-state battery 100.

In some embodiments, one or more portions of substrate 202 and/or cap 204 may be a part of solid-state battery 100. For example, a conductive portion of substrate 202 may act as an electrode (e.g., a cathode) of solid-state battery 100. In some embodiments, compressible component 206 may be disposed between substrate 202 and solid-state battery 100, with a conductive portion of cap 204 acting as an electrode (e.g., an anode) of solid-state battery 100. In still further embodiments, a portion of substrate 202 may act as one electrode (e.g., a cathode) of solid-state battery 100 and a portion of cap 204 may act as another electrode (e.g., an anode) of solid-state battery 100. In such embodiments, compressible component 206 may be eliminated.

Figure 3A:
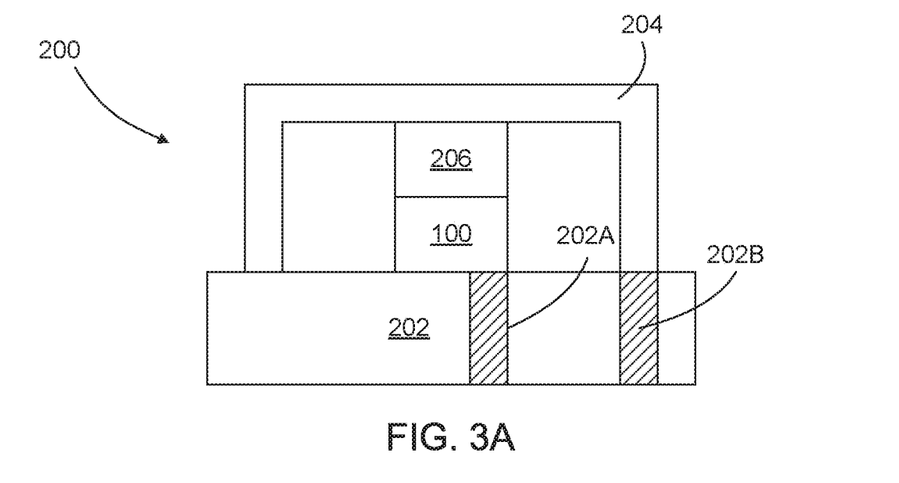
FIGS. 3A-3B illustrate example interconnect configurations of a package enclosing a solid-state battery, in accordance with embodiments of the present disclosure.
Figure 3B:
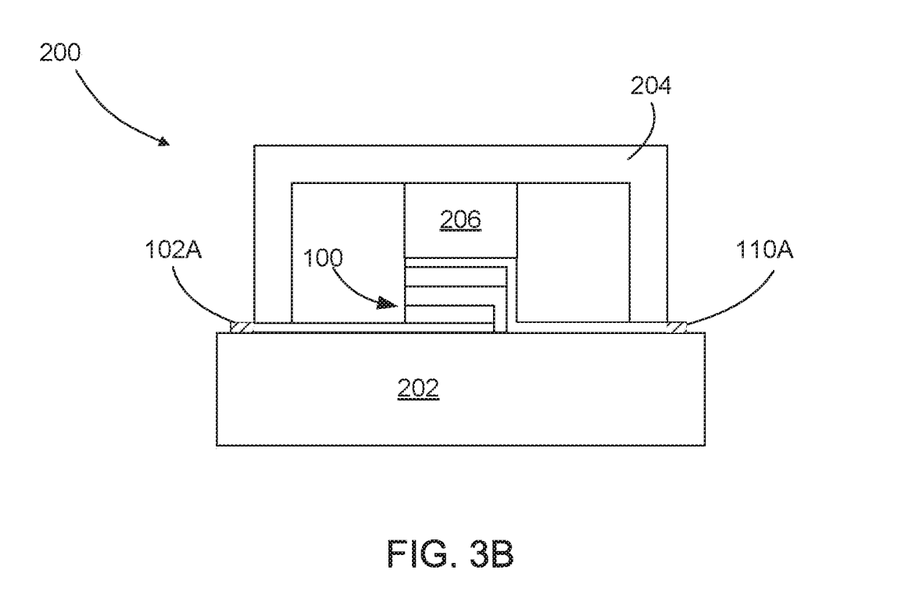

FIGS. 3A-3B illustrate various interconnect configurations of a package 200 enclosing solid-state battery 100, in accordance with embodiments of the present disclosure. Packages 200 of FIGS. 3A and 3B are similar to package 200 of FIG. 2A except that packages 200 of FIGS. 3A and 3B are shown with interconnect configurations for making electrical connections to an enclosed solid-state battery 100.

In FIG. 3A, substrate 202 includes a first through-substrate via (TSV) 202A and a second TSV 202B. In some embodiments, TSVs 202A and 202B may include a conductive material that extends from one surface of substrate 202 to an opposite surface of substrate 202 and may further include a passivation layer that electrically insulates the conductive material from substrate 202. In some embodiments, TSVs 202A and 202B are formed by etching a hole in substrate 202 (e.g., using a deep reactive ion etching (DRIE) or laser drilling process), forming a passivation layer (e.g., using a thermal oxidation process), and filing the hole with a conductive material (e.g., using an electroplating process).

In FIG. 3A, first TSV 202A and second TSV 202B are electrically connected to the electrodes of solid-state battery 100. For example, in FIG. 3A, the electrode closest to substrate 202 (e.g., cathode contact 102 and/or cathode 104) is formed directly over, and thus electrically connected to, first TSV 202A. The electrode furthest away from substrate 202 (e.g., anode contact 110 and/or anode 108) is electrically connected to second TSV 202B via compressible component 206 and cap 204.

Compressible component 206 may electrically connect an electrode of solid-state battery 100 to cap 204 in a number of ways. In some embodiments, compressible component 206 may be made entirely of one or more conductive materials, such as a conductive elastomer. Alternatively, or additionally, as will be shown in FIGS. 4A and 4C, compressible component 206 may include one or more one or more conductive structures that are mechanically flexible and extend from an electrode of solid-state battery 100 to cap 204. Alternatively, or additionally, as will be shown in FIGS. 4B and 4D, compressible component 206 may include one or more conductive structures that are mechanically flexible; extend from an electrode of solid-state battery 100 to cap 204; and are embedded in a layer of non-conductive compressible material such as an elastomer.

Cap 204 may electrically connect compressible component 206 to second TSV 202B in a number of ways. In some embodiments, cap 204 may be made entirely of one or more conductive materials, such as metal or doped silicon. Alternatively, or additionally, cap 204 may include a conductive material may be disposed over the surface of the cavity of cap 204, and the conductive material may electrically interconnect compressible component 206 to second TSV 202B.

In some embodiments, such a conductive material may be disposed and patterned to at least partially cover the inside surface of the cavity of cap 204. In some embodiments, such a conductive material may be disposed to cover the entire inside surface of the cavity of cap 204.

In FIG. 3B, package 200 encloses solid-state battery 100 shown in FIG. 1B. Here, anode contact 110 and cathode contact 102 include portions 110A and 102A, respectively, that extend outside the space enclosed by substrate 202 and cap 204. As shown in FIG. 3B, a portion of anode contact 110 and a portion of cathode contact 102 may be interposed at the interface between cap 204 and substrate 202. That is, cap 204 may be attached to anode contact 110 and cathode contact 102, which are disclosed on substrate 202, to form the enclosure. In FIG. 3B, a device may electrically connect to solid-state battery 100 enclosed in package 200 by electrically coupling to portions 110A and 102A. In some embodiments, an electrical insulation layer may also be disposed at the interface between cap 204 and substrate 202 so as to electrically insulate anode contact 110 and/or cathode contact 102 from cap 204.

Figure 4A:
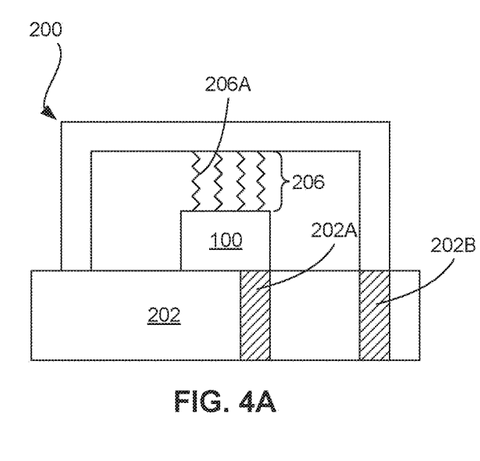
FIGS. 4A-4D illustrate example compressible components of a package enclosing a solid-state battery, in accordance with embodiments of the present disclosure.
Figure 4B:
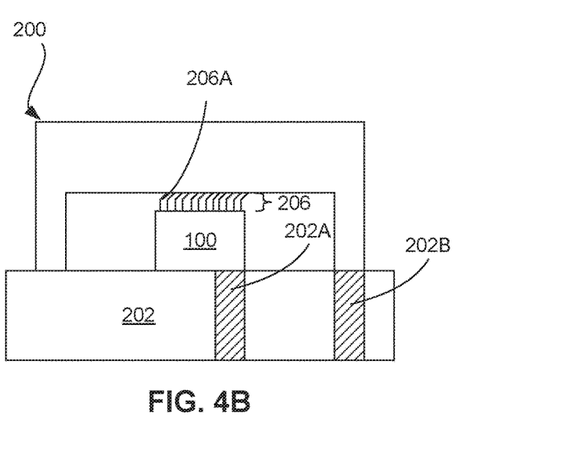
Figure 4C:
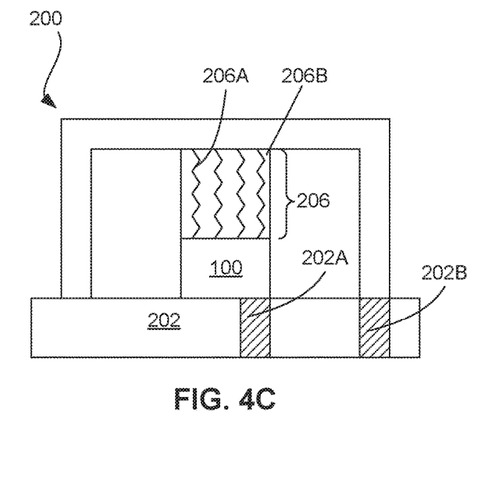
Figure 4D:
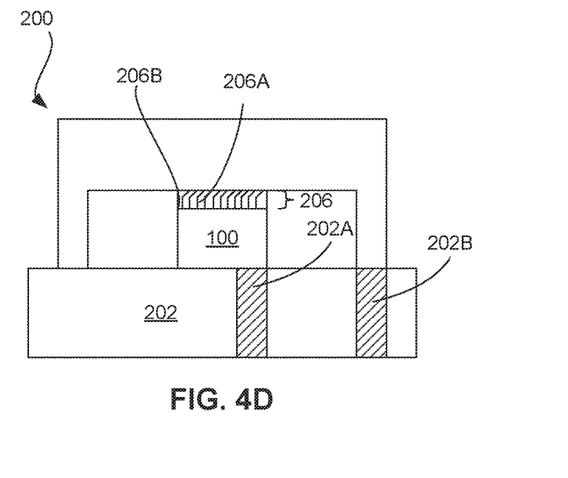

FIGS. 4A-4D illustrate example compressible components 206 of package 200 enclosing solid-state battery 100, in accordance with embodiments of the present disclosure. In FIGS. 4A-4D, compressible components 206 include one or more mechanically flexible interconnects (MFIs). An MFI is an electrical interconnect that can elastically deform in one or more directions. In one example, as shown in FIG. 4A, MFIs 206A may have a spring shape that can be compressed when pressure is applied and return to its original shape or a partially compressed state when the pressure is removed. In another example, as shown in FIG. 4C, MFI 206A may have a cantilever shape. In some embodiments, one or more MFIs of compressible component 206 may be embedded in a layer of compressible material 206B such as an elastomer. For example, as shown in FIGS. 4C and 4D, MFIs 206A (spring shaped or cantilever shaped) are embedded in a layer of compressible material 206B.

Figure 5A:
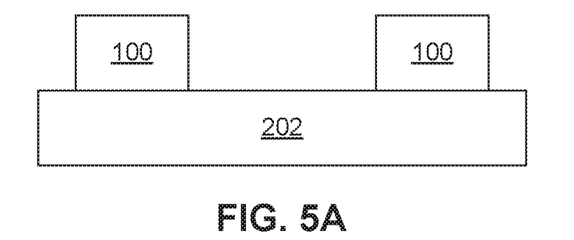
FIGS. 5A-5D illustrate partially fabricated and completed packages for enclosing solid-state batteries, in accordance with embodiments of the present disclosure.

FIG. 5A is a cross-sectional view of partially fabricated packages 200 for enclosing a solid-state battery 100, in accordance with embodiments of the present disclosure. In the partially fabricated package 200 of FIG. 5A, a single substrate 202 is provided and a plurality of solid-state batteries 100 are formed on substrate 202. In some embodiments, two or more solid-state batteries 100 may be formed at the same time. In some embodiments, one solid-state battery 100 may be formed at a time.

In some embodiments, prior to, during, and/or after the formation of solid-state batteries 100, various devices may be formed in and/or on substrate 202. For example, various circuit components (e.g., transistors, metal wires, micro-electro-mechanical devices) may be formed in and/or on substrate 200 prior to, during, and/or after the formation of solid-state batteries 100. In another example, various devices (e.g., surface-mount devices) may be assembled on substrate 200 prior to, during, and/or after the formation of solid-state batteries 100. In some embodiments, the device to be powered may be formed prior to, during, and/or after the formation of solid-state batteries 100.

In some embodiments, prior to the formation of one or more of solid-state batteries 100, one or more cavities may be formed in substrate 202 (see, e.g., substrate 202 of FIGS. 2B and 2C). These cavities may be formed using an etching process, such as, but not limited to, plasma-based etching (e.g., reactive ion etching), chemical-based ("wet") etching, gas-based etching (e.g., using XeF), and/or laser etching.

Alternatively, or additionally, these cavities may be formed by bonding one or more spacer structures (e.g., 202B in FIGS. 2B and 2C) to a flat substrate (e.g., 202A in FIGS. 2B and 2C). Subsequently, one or more solid-state batteries 100 may be formed inside these cavities.

In some embodiments, the formation of solid-state batteries 100 may include forming a cathode contact, forming a cathode, forming an electrolyte, forming an anode, and forming an anode contact.

In some embodiments, cathode contact 104 and/or anode contact 110 may be formed using any deposition process, such as, but not limited to atomic layer deposition (ALD), physical vapor deposition (PVD) (e.g., sputtering or evaporation), plasma enhanced chemical vapor deposition (PECVD), low-pressure chemical vapor deposition (LPCVD), chemical vapor deposition (CVD), magnetron sputtering, thermal evaporation, e-beam evaporation, electroplating, electro-less plating, or a combination thereof. In some embodiments, anode 108 may be formed using a PVD process. In some embodiments, cathode 108 may be formed using a PVD process.

In some embodiments, the formation of the cathode may include annealing the cathode at an elevated temperature for a predetermined amount of time. In one example, the annealing temperature may be between 100-1000 degrees Celsius, and the anneal duration may be between 1-10 hours. In some embodiments, the annealing process may be performed after the formation of the cathode but before the formation of the electrolyte and/or the anode. In these embodiments, the anode is not exposed to the annealing temperature. Exposing the anode to the annealing temperature may negatively affect the performance of solid-state battery 100.

Figure 5B:
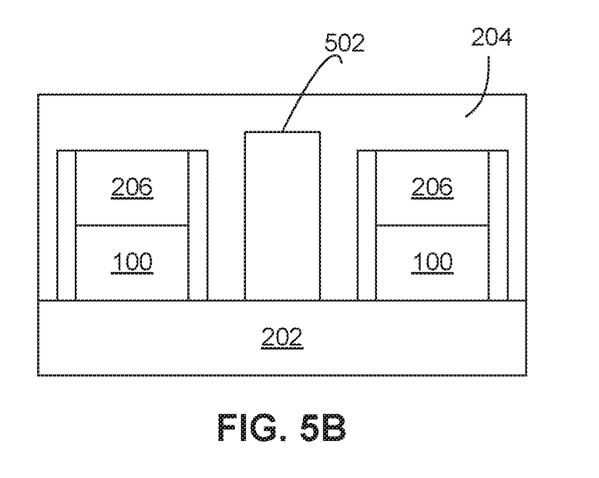

FIG. 5B is a cross-sectional view of partially fabricated packages 200 of FIG. 5A after cap 204 is attached to substrate 202 and compressible components 206 are interposed between cap 204 and solid-state batteries 100. As shown in FIG. 5B, cap 204 includes a plurality of cavities, each cavity may have a depth equal to the combined thickness of compressible component 206 (in a compressed state) and solid-state battery 100. However, as shown in FIG. 2B, the cavities in cap 204 may have a depth that is smaller the combined thickness of compressible component 206 (in a compressed state) and solid-state battery 100. Alternatively, as shown in FIG. 2C, cap 204 may be flat and a sufficiently deep cavity may be provided in substrate 202 for each solid-state battery 101.

In some embodiments, as shown in FIG. 5B, cap 204 may include an additional cavity 502 between the cavities for enclosing solid-state batteries 100. Additional cavity 502 may be deeper and/or narrower than the cavities for enclosing solid-state batteries 100. In some embodiments, additional cavity 502 and the cavities for enclosing solid-state batteries 100 may be formed simultaneously by exploiting the loading effects associated with various etch processes (e.g., reactive ion etching). The additional cavity 502 may be used for various purposes. For example, additional cavity 502 may act be used to indicate a saw street for die cutting process.

In some embodiments, cap 204 may be attached to substrate 202 using a bonding process, such as, but not limited to, eutectic bonding (AlGe, CuSn, AuSi), fusion bonding, compression bonding, thermo-compression bonding, adhesive bonding, solder bonding, anodic bonding, glass frit, room-temperature laser welding, low-temperature solder-reflow bonding. Embodiments of the present disclosure are not limited to these examples and it will be appreciated from this disclosure that other sealing or bonding processes and materials may be used for attaching cap 204 to substrate 202. In some embodiments, cap 204 may be attached to substrate 202 in an inert environment (e.g., a chamber containing argon or nitrogen) and/or under vacuum.

Before cap 204 is attached to substrate 202, the combined height of compressible components 206 and solid-state batteries 100 may be greater than the depth of the cavities of cap 204. Therefore, during the attachment process, cap 204 may compress the compressible components 206 so that compressible components 206 and solid-state batteries 100 may fit inside the cavities of cap 204 and enclosed by substrate 202 as shown in FIG. 5B.

In some embodiments, compressible components 206 may be disposed over solid-state batteries 100 before cap 204 is bonded to substrate 202. Alternatively, or additionally, compressible components 206 may be disposed inside the cavities of cap 204 before cap 204 is bonded to substrate 202. In some embodiments, compressible components 206 may further be disposed on one or more sides of each solid-state battery 100 and/or on a portion of substrate 202. In some embodiments, compressible component 206 may be disposed over a portion of the top surface of solid-state battery 100. In some embodiments, compressible components 206 may be disposed using processes such as spin coating, dip coating, jetting, spraying, or laminating.

Figure 5C:
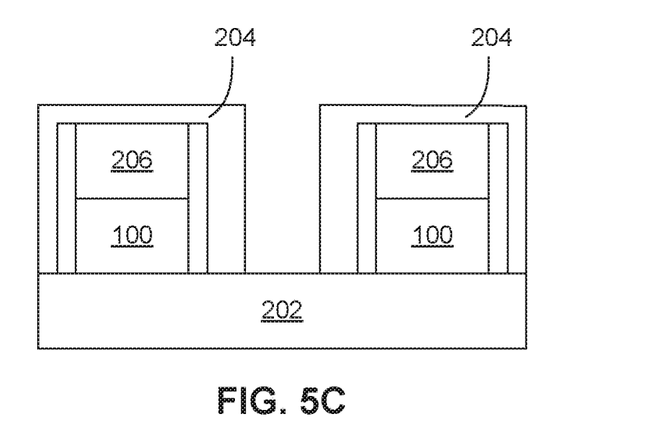
Figure 5D:
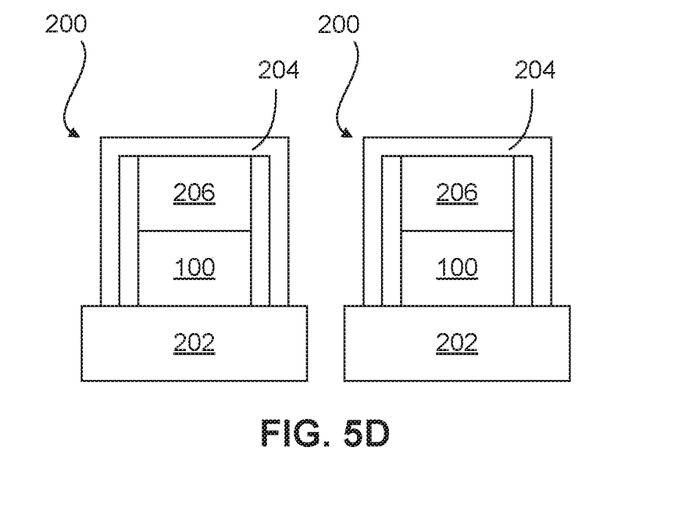

FIG. 5C is a cross-sectional view of partially fabricated packages 200 enclosing solid-state batteries 100 after cap 204 is thinned (e.g., using a grinding and/or polishing process) to expose the space that was enclosed by cavity 502. FIG. 5D is a cross-sectional view of completed fabricated packages 200 enclosing solid-state batteries 100 after substrate 202 is diced.

Figure 6:
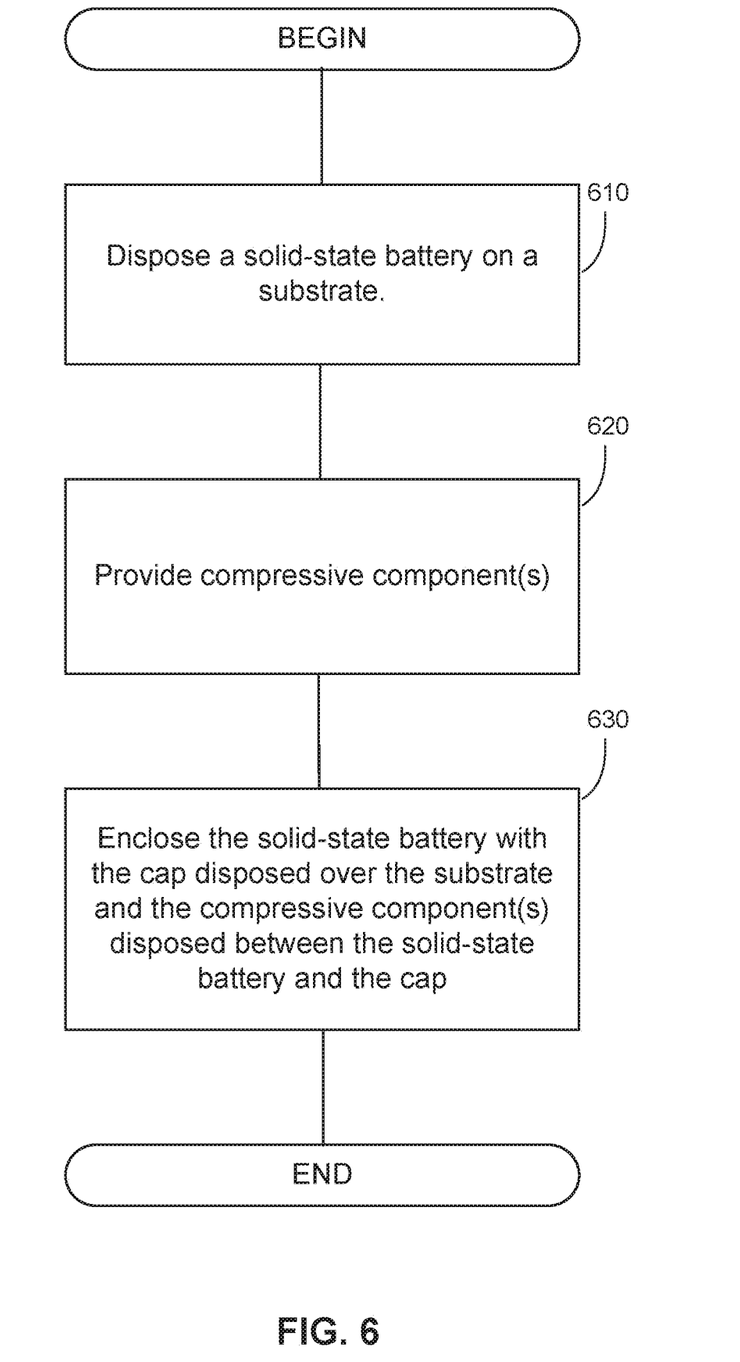
FIG. 6 is a flow diagram of an example process for manufacturing a package for enclosing a solid-state battery, in accordance with embodiments of the present disclosure.

FIG. 6 is a flow diagram of an example process 100 for packaging a solid-state battery, in accordance with embodiments of the present disclosure. As illustrated in FIG. 6, at step 610, the solid-state battery is disposed or formed on a substrate. As disclosed herein (see, e.g., FIGS. 1A and 1B), the solid-state battery may have a first electrode disposed over the substrate, an electrolyte disposed over the first electrode, and a second electrode disposed over the electrolyte.

In some embodiments, the compressible components may be in a partially compressed state after the enclosing of the solid-state battery such that the compressible components are further compressed when the solid-state battery expands and expands when the solid-state battery shrinks. Further, in these embodiments, the compressible components may maintain the pressure applied to the second electrode of the solid-state battery after the solid-state battery shrinks. In some embodiments, the disposing of the solid-state battery may include disposing a cathode, annealing the cathode, disposing an electrolyte over the annealed cathode, and disposing an anode over the electrolyte. In some embodiments, the disposing of the solid-state battery may include attaching a die that includes the solid-state battery to the substrate. For example, a die that includes the solid-state battery may be flip-chip bonded to the substrate.

At step 620, one or more compressible components are provided. As disclosed above, each compressible component may be operable between a compressed or partially compressed state, and a non-compressed state. The compressible component(s) may have various shapes, including a spring shape or a cantilever shape. In some embodiments, the compressible component(s) may be provided in a layer of an elastomeric material. In some embodiments, the compressible component(s) may comprise one or more mechanically flexible interconnects.

At step 630, the solid-state battery is enclosed with at least the cap and the substrate and with the compressible component(s) disposed between the solid-state battery and the cap. As part of this step, cap 204 may be attached to substrate 202 using a sealing or bonding process. Various example processes for this purpose are presented above. As a result of enclosing the solid-state battery with the cap and substrate, the compressible component(s) are arranged to apply a pressure to at least one electrode of the solid-state battery (e.g., a first or second electrode of the solid-state battery) in a direction substantially perpendicular to the electrode(s) of the solid-state battery. In some embodiments, the step of enclosing the solid-state battery may include hermetically enclosing or sealing the solid-state battery. In these embodiments, cap 204 may bonded to substrate 202 using various hermetic bonding techniques such as, but not limited to, anodic bonding, eutectic bonding, metal-to-metal bonding, thermo-compression bonding.

At an optional step, a cavity may be formed in at least one of the cap and the substrate. Further, the enclosing of the solid-state device may include positioning at least a portion of the solid-state battery inside the cavity. In some embodiments, the forming of the cavity may include attaching a flat portion to at least one spacer portion.

At another optional step, one or more through-substrate interconnects may be formed in the substrate, electrically coupling the through-substrate interconnect(s) with a portion of the solid-state battery via the cap.

In the preceding specification, various exemplary embodiments and features have been described with reference to the accompanying drawings. It will, however, be evident that various modifications and changes may be made thereto, and additional embodiments and features may be implemented, without departing from the broader scope of the invention as set forth in the claims that follow. For example, advantageous results still could be if components in the disclosed systems were combined in a different manner and/or replaced or supplemented by other components. Other implementations are also within the scope of the following exemplary claims. The specification and drawings are accordingly to be regarded in an illustrative rather than restrictive sense. Moreover, it is intended that the disclosed embodiments and examples be considered as exemplary only, with a true scope of the present disclosure being indicated by the following claims and their equivalents.

What is claimed is:

1. A package for a solid-state battery, comprising:
a hermetic enclosure;
a solid-state battery disposed inside the hermetic enclosure, wherein the solid-state battery comprises a first electrode, a second electrode, and an electrolyte, and wherein the electrolyte is disposed between the first electrode and the second electrode; and
a compressible component disposed inside the hermetic enclosure and between a portion of the hermetic enclosure and the second electrode of the solid-state battery, wherein the compressible component applies a pressure to at least the second electrode of the solid-state battery.

2. The package of claim 1, wherein the compressible component is further compressed when the solid-state battery expands and maintains the pressure applied to the second electrode of the solid-state battery after the solid-state battery shrinks.

3. The package of claim 1, wherein the compressible component comprises an elastomeric material.

4. The package of claim 1, wherein the compressible component comprises an electrically conductive component.

5. The package of claim 4, wherein the electrically conductive component comprises one or more mechanically flexible electrical interconnects.

6. The package of claim 1, wherein the second electrode is an anode of the solid-state battery.

7. The package of claim 1, wherein the hermetic enclosure comprises a cap and a substrate.

8. The package of claim 7, wherein the compressible component is disposed between the cap and the second electrode.

9. The package of claim 7, wherein the hermetic enclosure further comprises a spacer interposed between the cap and the substrate.

10. The package of claim 7, wherein the substrate includes a through-substrate interconnect (TSV) electrically coupled to at least one of the first electrode or the second electrode of the solid-state battery.

11. The package of claim 1, the second electrode of the solid-state battery is a cathode.

12. A method of packaging a solid-state battery, comprising:
disposing a solid-state battery on a substrate, wherein the solid-state battery comprises a first electrode, a second electrode, and an electrolyte, and wherein the electrolyte is disposed between the first electrode and the second electrode; and
enclosing the solid-state battery and a compressible component inside a hermetic enclosure, such that the compressible component is disposed in a compressed state between the solid-state battery and a portion of the hermetic enclosure and applies a pressure to at least the second electrode of the solid-state battery.

13. The method of claim 12, wherein the compressible component is further compressed when the solid-state battery expands and maintains the pressure applied to the second electrode of the solid-state battery after the solid-state battery shrinks.

14. The method of claim 12, wherein enclosing the solid-state battery and the compressible component inside the hermetic enclosure comprises coupling a cap coupled to the substrate.

15. The method of claim 14, wherein coupling the cap coupled to the substrate comprises coupling the cap to the substrate via a spacer interposed between the cap and the substrate.

16. A system comprising:
an electronic circuit including a first node and a second node;
a power source including:
a hermetic enclosure;
a solid-state battery disposed inside the hermetic enclosure, wherein the solid-state battery comprises a first electrode, a second electrode, and an electrolyte, and wherein the electrolyte is disposed between the first electrode and the second electrode; and
a compressible component disposed inside the hermetic enclosure and between a portion of the hermetic enclosure and the second electrode of the solid-state battery, wherein the compressible component applies a pressure to at least the second electrode of the solid-state battery.

17. The electronic system of claim 16, wherein the first node is electrically coupled to the first electrode of the solid-state battery and the second node is electrically coupled to the second electrode of the solid-state battery.

18. The electronic system of claim 16, wherein the hermetic enclosure comprises a cap and a substrate.

19. The electronic system of claim 18, wherein the electronic circuit is electrically coupled to the solid-state battery via at least one of the cap or a through-substrate via (TSV) in the substrate.

* * * * *